United States Patent
Minami et al.

(10) Patent No.: US 8,046,359 B2
(45) Date of Patent: Oct. 25, 2011

(54) DATA PROCESSING APPARATUS, DISPLAY CONTROL METHOD, AND DISPLAY CONTROL PROGRAM EMBODIED ON COMPUTER READABLE MEDIUM

(75) Inventors: Takeshi Minami, Amagasaki (JP); Mitsuzo Iwaki, Osaka (JP); Kenichi Takahashi, Sennan-gun (JP); Daisuke Sakiyama, Kawanishi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 326 days.

(21) Appl. No.: 12/401,068

(22) Filed: Mar. 10, 2009

(65) Prior Publication Data

US 2009/0307575 A1    Dec. 10, 2009

(30) Foreign Application Priority Data

Jun. 6, 2008 (JP) ................................. 2008-148856

(51) Int. Cl.
*G06F 17/30* (2006.01)
(52) U.S. Cl. .................... 707/736; 707/751; 715/723
(58) Field of Classification Search .................. 707/736, 707/751; 715/723, 850
See application file for complete search history.

(56) References Cited

U.S. PATENT DOCUMENTS
2004/0128354 A1    7/2004   Horikiri et al.

FOREIGN PATENT DOCUMENTS

| JP | 03-123387 | 5/1991 |
|---|---|---|
| JP | 05-067150 | 3/1993 |
| JP | 10-055391 | 2/1998 |
| JP | 2001-022519 | 1/2001 |
| JP | 2003-058901 | 2/2003 |
| JP | 2004-171526 A | 6/2004 |
| JP | 2005-284196 | 10/2005 |
| JP | 2008-035384 A | 2/2008 |

OTHER PUBLICATIONS

Machine Translated Japanese Patent Application Publication No. 2003-058901 by Kita et al.; pp. 1-23.*
Machine Translated Japanese Patent Application Publication No. 10-55391 by Hayashi; pp. 1-13.*
Notice of Ground of Rejection issued in the corresponding Japanese Patent Application No. 2008-148856 dated May 18, 2010, and an English Translation thereof.

* cited by examiner

*Primary Examiner* — Apu Mofiz
*Assistant Examiner* — Monia Pyo
(74) *Attorney, Agent, or Firm* — Buchanan Ingersoll & Rooney PC (57) ABSTRACT

In order to reproduce the content output before, an MFP includes an HDD to store data which includes a plurality of page data having corresponding page numbers, an instruction accepting portion to accept a page number of one of the page data to be displayed on a projector, a display control portion to cause the page data of the accepted page number to be displayed on the projector, a history storing portion to store, for each of the page data displayed, history information in which the page number of the page data, the actually displayed time of the page data, and the actually displayed order of the page data are associated with each other, and a redisplay control portion to cause the plurality of page data to be displayed on the projector based on the history information on the condition that the history information is designated.

9 Claims, 8 Drawing Sheets

| INSTRUCTION | ACTUALLY DISPLAYED ORDER | PAGE NUMBER | ACTUALLY DISPLAYED TIME | STATE OF REPRODUCTION | | | |
|---|---|---|---|---|---|---|---|
| | | | | MOTION PICTURE/ SOUND LINKED | REPRODUCTION RANGE | VOLUME LEVEL | TONE SETTING |
| — | 1 | 1 | 120 | | | | |
| FORWARD | 2 | 2 | 60 | YES | ALL | 5 | 1 (BASS BOOST) |
| FORWARD | 3 | 3 | 60 | NO | | | |
| FORWARD | 4 | 4 | 9 | NO | | | |
| FORWARD | 5 | 5 | 120 | YES | 00:00:00~00:01:34 | 3 | 1 (BASS BOOST) |
| FORWARD | 6 | 6 | 9 | NO | | | |
| BACK | 7 | 5 | 9 | YES | | | |
| BACK | 8 | 4 | 120 | NO | | | |
| BACK | 9 | 3 | 8 | NO | | | |
| FORWARD | 10 | 4 | 8 | YES | | | |
| FORWARD | 11 | 5 | 8 | NO | | | |
| FORWARD | 12 | 6 | 120 | NO | | | |
| FORWARD | 13 | 7 | 120 | NO | | | |
| FORWARD | 14 | 8 | 250 | YES | 00:00:00~00:03:50 | 8 | 2 (TREBLE BOOST) |
| FORWARD | 15 | 9 | 120 | NO | | | |
| FORWARD | 16 | 10 | 160 | NO | | | |

DATA PROCESSING APPARATUS, DISPLAY CONTROL METHOD, AND DISPLAY CONTROL PROGRAM EMBODIED ON COMPUTER READABLE MEDIUM

This application is based on Japanese Patent Application No. 2008-148856 filed with Japan Patent Office on Jun. 6, 2008, the entire content of which is hereby incorporated by reference.

BACKGROUND OF THE INVENTION

1. Field of the Invention

The present invention relates to a data processing apparatus, a display control method, and a display control program. More particularly, the present invention relates to a data processing apparatus operatively connectable with a display apparatus such as a projector, and a display control method and a display control program performed in the data processing apparatus.

2. Description of the Related Art

In recent years, a projector is employed in a conference or for a presentation. The projector receives an input of an image and throws the image onto a screen. When there are two or more pages to be displayed on the projector, the presenter predetermines in which order the plurality of pages of images are to be displayed, to cause the images to be displayed according to the predetermined order. The images, however, may be displayed each for a different period of time and in an order different from the predetermined order according to the actual progress of the conference or the presentation.

Japanese Patent Application Laid-Open No. 2004-171526 discloses a teleconferencing system in which a session for managing connection between conference systems, a file used during the conference or generated as a record of the conference, reference to a resource related to the conference, and history information such as a file access performed by a conference participant are managed to allow the participants to perform GUI operations to establish connection of the conference systems without being aware of the call addresses of the individual conference systems, and to make an easy access to the information such as the file related to the conference from the conference systems. With the conventional teleconferencing system, however, the files accessible from the history information remain unchanged before and after the conference, which means that it is not possible to acquire the document modified according to the actual content of presentation.

Further, Japanese Patent Application Laid-Open No. 2008-035384 discloses an image processing system in which, for an electronic document for presentation having images of a plurality of pages, a presentation time is acquired for each page of the electronic document, and the images of the plurality of pages are united into one image while being allocated in accordance with the acquired presentation times, and the resultant page is output. In allocation of the images, the sizes of the respective pages are calculated to correspond to their presentation times. With the conventional image processing system, however, the sizes of the images of the plurality of pages are determined in accordance with the time spent for presentation. Although it is possible to know the time spent in the presentation for each page by seeing the single image, it is not possible to know the order in which the images were used in the presentation. Further, the images of the pages that were not used in the actual presentation are displayed as well, suppressing the content of the actual presentation from being represented accurately.

SUMMARY OF THE INVENTION

The present invention has been accomplished in view of the foregoing problems, and an object of the present invention is to provide a data processing apparatus capable of reproducing the content once output before.

Another object of the present invention is to provide a display control method which enables reproduction of the content once output before.

A further object of the present invention is to provide a display control program which enables reproduction of the content once output before.

In order to achieve the above-described objects, according to an aspect of the present invention, a data processing apparatus is operatively connectable with a display apparatus and includes: a data storing portion to store data which includes a plurality of page data as a predetermined display unit, the plurality of page data having corresponding page numbers; an instruction accepting portion to accept a page number of one page data which is to be displayed on the display apparatus among the plurality of page data included in the stored data; a display control portion to cause the page data of the accepted page number among the plurality of page data included in the data to be displayed on the display apparatus; a history storing portion to store, for each of the page data which has been displayed, a display history including identification information for identification of the page data, an actually displayed time indicating the time during which the page data was displayed, and an actually displayed order indicating the order in which the page data was displayed; and a redisplay control portion to cause the plurality of page data included in the data to be displayed on the display apparatus based on the display history on the condition that the display history is designated.

According to another aspect of the present invention, there is provided a display control method which is carried out in a data processing apparatus operatively connectable with a display apparatus, wherein the method includes the steps of: storing data which includes a plurality of page data as a predetermined display unit, the plurality of page data having corresponding page numbers; accepting a page number of one page data which is to be displayed on the display apparatus among the plurality of page data included in the stored data; causing the page data of the accepted page number among the plurality of page data included in the data to be displayed on the display apparatus; storing a display history including identification information for identification of the page data displayed, an actually displayed time indicating the time during which the page data was displayed, and an actually displayed order indicating the order in which the page data was displayed; and causing the plurality of page data included in the data to be displayed on the display apparatus based on the display history on the condition that the display history is designated.

According to a further aspect of the present invention, there is provided a display control program which is embodied on a computer readable medium and carried out in a computer which controls a data processing apparatus operatively connectable with a display apparatus, wherein the program causes the computer to perform the steps of: storing data which includes a plurality of page data as a predetermined display unit, the plurality of page data having corresponding page numbers; accepting a page number of one page data which is to be displayed on the display apparatus among the plurality of page data included in the stored data; causing the page data of the accepted page number among the plurality of page data included in the data to be displayed on the display apparatus; storing a display history including identification information for identification of the page data displayed, an actually displayed time indicating the time during which the page data was displayed, and an actually displayed order indicating the order in which the page data was displayed; and causing the plurality of page data included in the data to be displayed on the display apparatus based on the display history on the condition that the display history is designated.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will now be described with reference to the drawings. In the following description, like reference characters denote like parts, which have like names and functions, and therefore, detailed description thereof will not be repeated.

Figure 1:
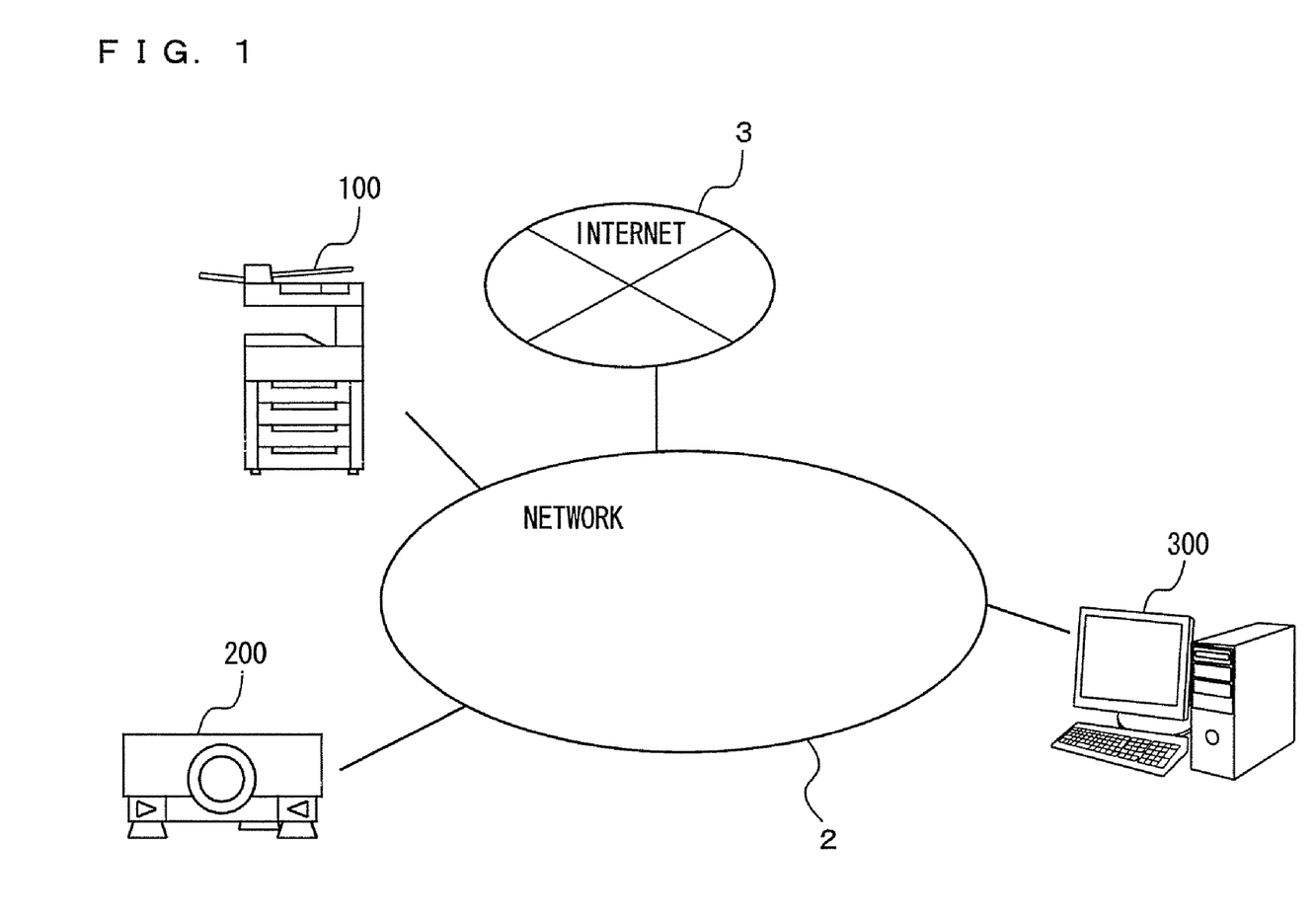
FIG. 1 is a schematic diagram of a conference system according to an embodiment of the present invention.

FIG. 1 schematically shows a conference system according to an embodiment of the present invention. Referring to FIG. 1, the conference system 1 includes a multi-function peripheral (MFP) 100, a projector 200, and a personal computer (PC) 300, which are connected to a network 2.

Network 2 is a local area network (IAN), which may be connected in a wired or wireless manner. Network 2 is connected to the Internet 3. Network 2 is not necessarily the IAN; it may be a wide area network (WAN), public switched telephone networks (PSTN), the Internet, and the like.

MFP 100 is capable of communicating with projector 200 and PC 300 via network 2, and also capable of communicating with a computer connected to Internet 3.

While MFP 100 is described as an example of the data processing apparatus in the present embodiment, the data processing apparatus is not limited to MFP 100. It may be a scanner, printer, facsimile machine, computer, and the like.

Figure 2:
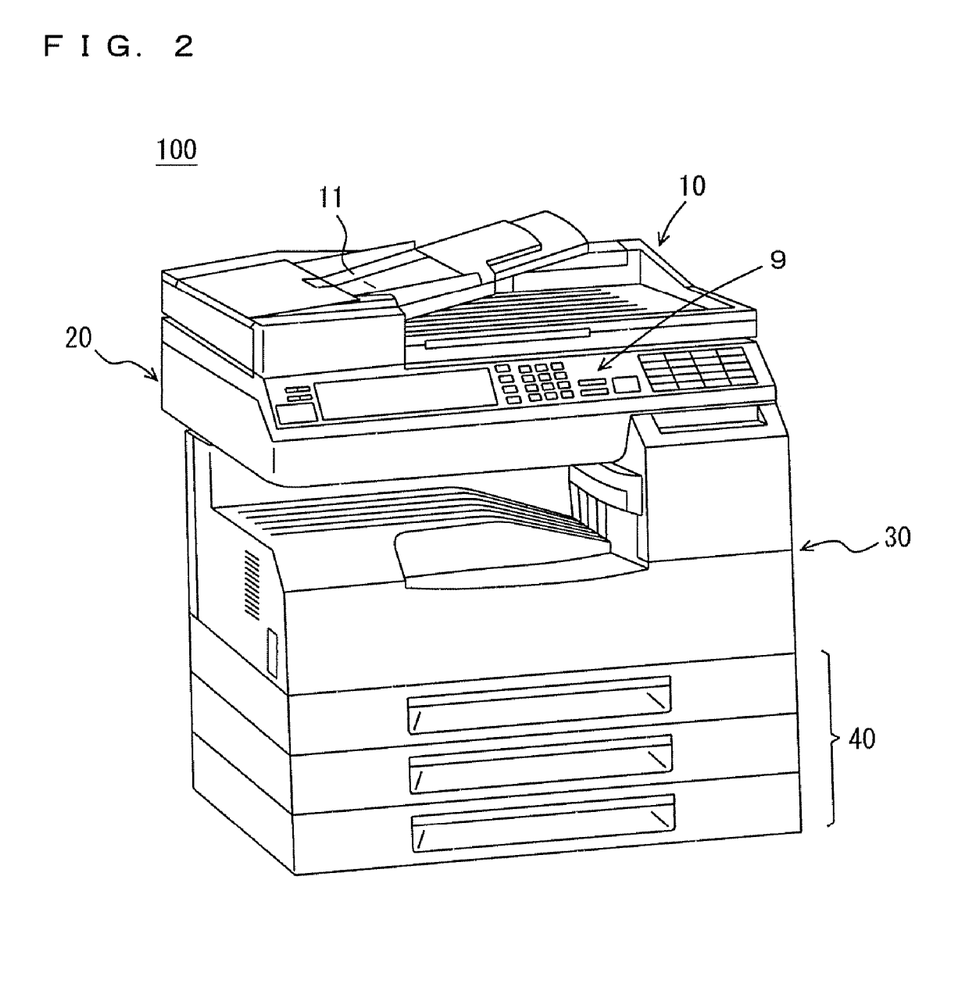
FIG. 2 is a perspective view of an MFP.

FIG. 2 is a perspective view of the MFP. Referring to FIG. 2, MFP 100 includes: an automatic document feeder (ADF) 10; an image reading portion 20; an image forming portion 30; and a paper feeding portion 40. ADF 10 delivers a plurality of originals mounted on a platform 11 one by one to image reading portion 20. Image reading portion 20 reads image information of photograph, character, picture and the like from the original in an optical manner to acquire image data.

Image forming portion 30, in receipt of the image data, forms an image on a sheet of paper based on the image data. Image forming portion 30 forms an image using toners of four colors of cyan, magenta, yellow, and black, to achieve full color printing. Alternatively, it may use one of the toners of four colors for monochrome printing. Paper feeding portion 40 stores sheets of paper, and supplies them one by one to image forming portion 30. MFP 100 includes an operation panel 9 on its upper surface.

Figure 3:
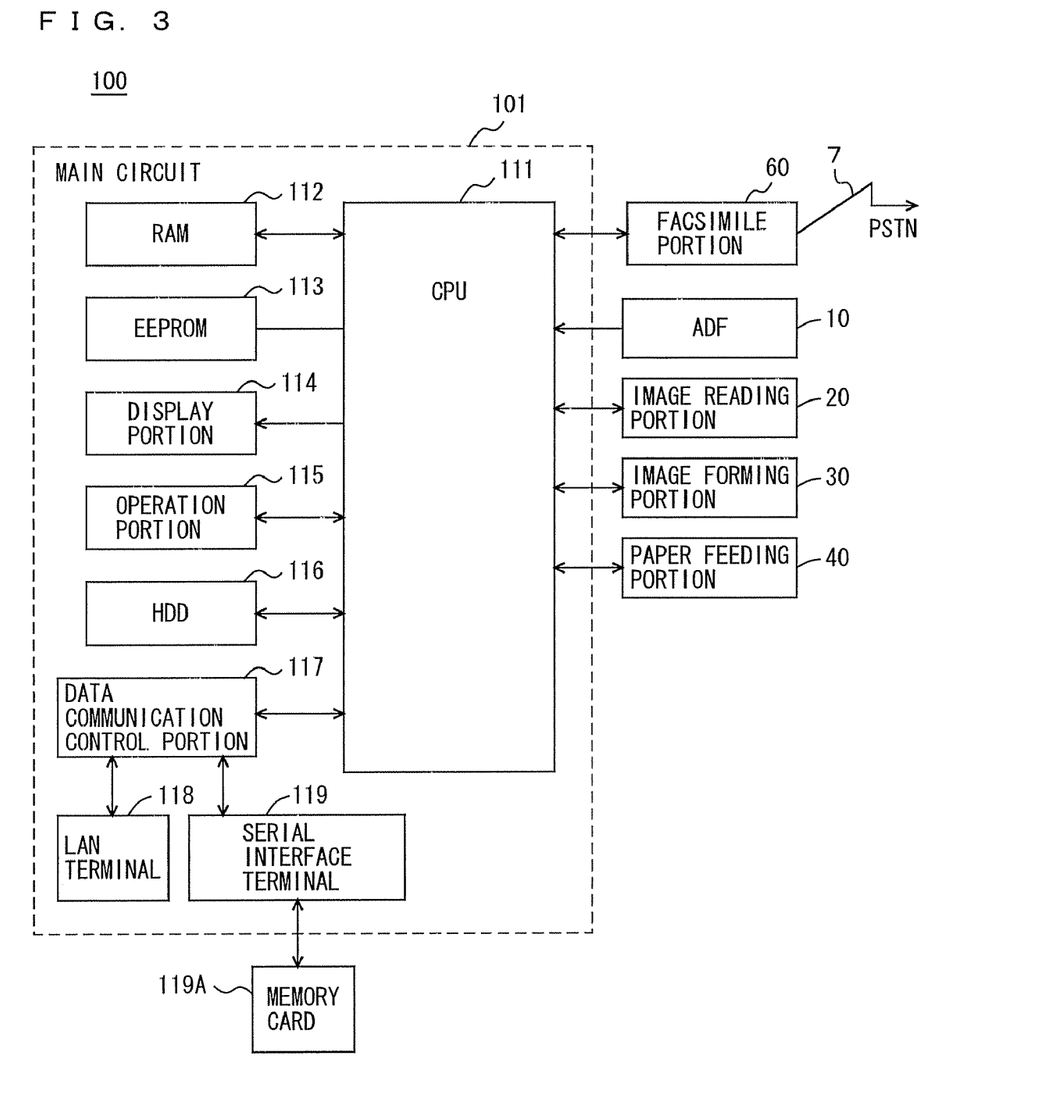
FIG. 3 is a block diagram showing an example of the hardware configuration of the MFP.

FIG. 3 is a block diagram showing an example of the hardware configuration of the MFP. Referring to FIG. 3, MFP 100 includes a main circuit 101, which is connected to a facsimile portion 60, ADF 10, image reading portion 20, image forming portion 30, and paper feeding portion 40. Main circuit 101 includes: a central processing unit (CPU) 111; a random access memory (RAM) 112 used as a work area for CPU 111; an electrically erasable and programmable read only memory (EEPROM) 113 for storing a program executed by CPU 111 and the like; a display portion 114; an operation portion 115; a hard disk drive (HDD) 116 as a mass storage; and a data communication control portion 117. CPU 111 is connected to display portion 114, operation portion 115, HDD 116, and data communication control portion 117, and is responsible for overall control of main circuit 101. Further, CPU 111 is connected to facsimile portion 60, ADF 10, image reading portion 20, image forming portion 30, and paper feeding portion 40, and is responsible for overall control of MFP 100.

Display portion 114 is a display such as a liquid crystal display (LCD), an organic electro-luminescence display (ELD) or the like, and displays an instruction menu for the user, information about acquired image data, and others. Operation portion 115 is provided with a plurality of keys, and accepts input of data such as instructions, characters, and numerical characters, according to the key operations of the user. Operation portion 115 includes a touch panel provided on display portion 114. Display portion 114 and operation portion 115 constitute operation panel 9.

Data communication control portion 117 includes a LAN terminal 118 that is an interface for communication according to a communication protocol such as transmission control protocol (TCP) or user datagram protocol (IJDP), and a serial interface terminal 119 for serial communication. Data communication control portion 117 transmits and receives data to and from an external apparatus connected to LAN terminal 118 or serial interface terminal 119, in accordance with an instruction from CPU 111.

When a LAN cable for connection with network 2 is connected to LAN terminal 118, data communication control portion 117 can communicate with projector 200 and PC 300 via IAN terminal 118.

CPU 111 controls data communication control portion 117 to read from a memory card 119A a program to be executed by CPU 111, and stores the read program in RAM 112 for execution. It is noted that the recording medium for storing the program to be executed by CPU 111 is not restricted to memory card 119A. It may be a flexible disk, a cassette tape, an optical disc (compact disc-ROM (CD-ROM), magneto-optical (MO) disc, mini disc (MD), digital versatile disc (DVD)), an IC card, an optical card, or a semiconductor memory such as a mask ROM, an EPROM, an EEPROM, or the like. Alternatively, CPU 111 may download the program from a computer connected to the Internet and store the same in HDD 116, or a computer connected to the Internet may write the program to HDD 116, and thereafter, the program stored in HDD 116 may be loaded to RAM 112 for execution by CPU 111. As used herein, the "program" includes, not only the one directly executable by CPU 111, but also a source program, a compressed program, an encrypted program, and others.

Facsimile portion 60 is connected to PSTN 7, and transmits facsimile data to or receives facsimile data from PSTN 7. Facsimile portion 60 stores the received facsimile data in HDD 116, or image forming portion 30 prints the facsimile data on a sheet of paper. Further, facsimile portion 60 converts the data stored in HDD 116 to facsimile data, and outputs it to a facsimile machine or another MFP connected to PSTN 7. This allows the data stored in HDD 116 to be output to a facsimile machine or another MFP.

Figure 4:
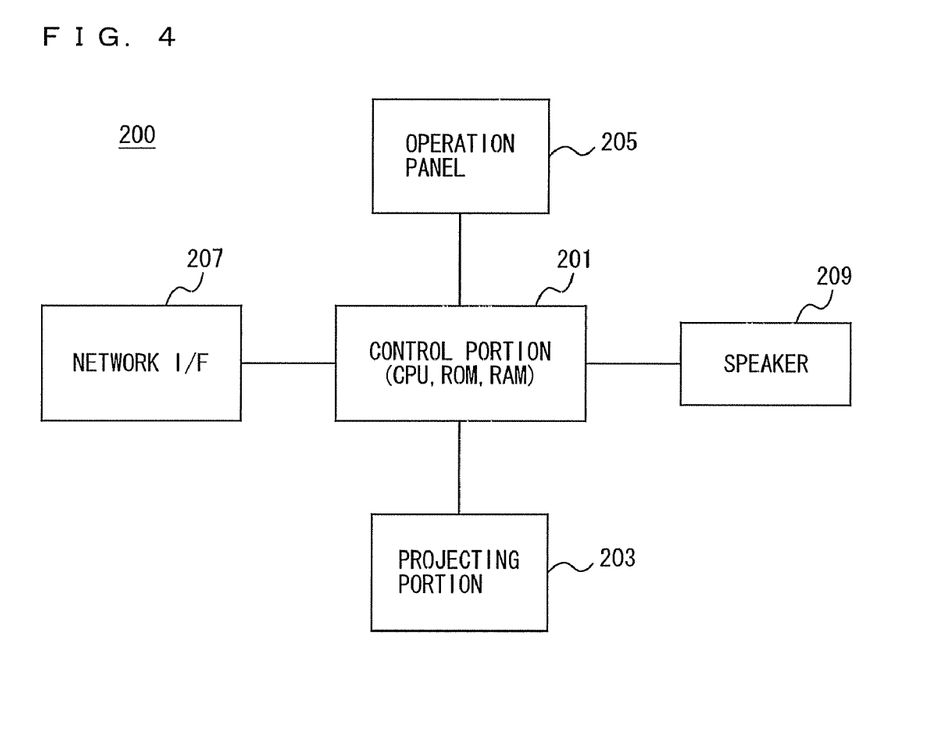
FIG. 4 is a functional block diagram showing by way of example the functions of a projector.

FIG. 4 is a functional block diagram showing by way of example the functions of the projector. Referring to FIG. 4, projector 200 includes: a control portion 201 responsible for overall control of projector 200; a network I/F 207 for connecting projector 200 to network 2; an operation panel 205 having a liquid crystal display for displaying a screen and a plurality of keys for accepting input of operations; a projecting portion 203 for projecting an image; and a speaker 209 for outputting a sound.

Control portion 201 includes a CPU, a RAM used as a work area, and a ROM for storing a program to be executed by the CPU. In receipt of data from MFP 100 via network I/F 207, control portion 201 converts the received data into data of a format suitable for projecting, and outputs the resultant data for projecting to projecting portion 203. Projecting portion 203 includes a liquid crystal display, a lens, and a light source. The liquid crystal display displays the data input from control portion 201. The light emitted from the light source passes through the liquid crystal display, and is emitted to the outside via the lens. When the light emitted from projecting portion 203 reaches a screen, a magnified version of the image displayed on the liquid crystal display appears on the screen. In a conference room, a screen specially installed therein is employed. A wall having a highly reflective surface may be used instead of the screen, in which case installation of the screen is unnecessary. Operation panel 205 is a user interface, and includes a display portion such as a liquid crystal display and an operation portion including a plurality of keys.

In the present embodiment, MFP 100 prestores data which are to be displayed by projector 200. The user can operate projector 200 to select the data the user wishes to display, from among the data stored in MFP 100.

Figure 5:
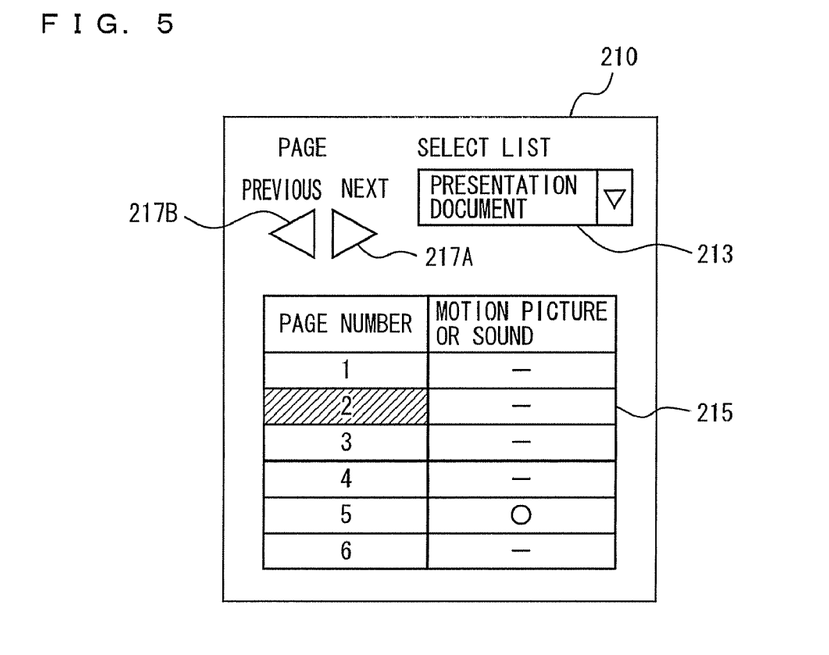
FIG. 5 shows an example of an operation screen displayed in the projector.

An operation of projector 200 will now be described with reference to the screen displayed on operation panel 205. FIG. 5 shows an example of an operation screen which is displayed at the projector. Referring to FIG. 5, the display screen 210 includes: an area 213 for the user to select data, an area 215 for displaying page numbers assigned respectively to a plurality of page data included in the data, and a forward button 217A and a back button 217B for the user to select one of the page numbers displayed in area 215.

When a drop down arrow provided to the right of area 213 is designated, control portion 201 transmits a data transmission request to MFP 100 via network I/F 207. In receipt of the data transmission request, MFP 100 transmits file names for identification of the data to projector 200, and projector 200 in turn displays a list of the file names on operation screen 210.

When the user inputs to operation panel 205 an instruction to select one of the file names in the displayed list, control portion 201 transmits a request for transmission of definition data, including the selected file name, to MFP 100 via network I/F 207. In receipt of the definition data transmission request, MFP 100 transmits definition data of the data specified by the file name included in the definition data transmission request to projector 200, and projector 200 in turn displays the page number included in the definition data in area 215 on operation screen 210. The page number displayed in area 215 is highlighted to indicate that the same has been selected. In the figure, the highlighted state is shown by hatching. Firstly, the first page is selected, and the page number "1" corresponding to the first page is highlighted.

In the case where a plurality of page numbers are displayed in area 215, forward button 217A and back button 217B are used for selecting any one of the page numbers. When forward button 217A or back button 217B is designated, control portion 201 transmits a "forward" instruction or a "back" instruction to MFP 100. In receipt of the "forward" instruction or the "back" instruction, MFP 100 transmits the page data of the page number that is specified by the "forward" or "back" instruction, and correspondingly, in projector 200, control portion 201 causes the image of the page data received from MFP 100 to be projected by projecting portion 203. Forward button 217A is a button for accepting an instruction to select the page number immediately following the page number being selected, while back button 217B is a button for accepting an instruction to select the page number immediately preceding the page number being selected. For example, if forward button 217A is designated in the initial state where the first page is selected, the page following the first page being selected, i.e., the second page, is selected. If back button 217B is designated next, the page preceding the second page being selected, i.e., the first page, is selected.

Further, in the case where the page data to be projected by projecting portion 203 is linked with a motion picture or a sound, when a reproduction instruction is input to operation panel 205 by the user, control portion 201 transmits a reproduction request to MFP 100. Whether the page data is linked with the motion picture or the sound is defined by definition data. In the case where the page data is linked with the motion picture or the sound, the definition data includes identification information for identification of the motion picture or the sound. The reproduction request includes identification information for identification of the motion picture or the sound. In receipt of the reproduction request, MFP 100 transmits the motion picture or the sound specified by the identification information included in the reproduction request, and correspondingly, in projector 200, control portion 201 causes the motion picture received from MFP 100 to be projected by projecting portion 203, or causes the sound received from MFP 100 to be output from speaker 209.

In outputting the motion picture or the sound, control portion 201 transmits to MFP 100 the state of reproduction of the motion picture or that of the sound which is input by the user to operation panel 205. The state of reproduction of the motion picture or the sound includes the reproduction range, volume, and tone. The tone includes settings of the volume level based on the frequencies, which are in this example "bass boost" and "treble boost". Every time the state of reproduction of the motion picture or the sound is changed, control portion 201 transmits the changed state of reproduction to MFP 100.

Further, control portion 201 transmits a redisplay request to MFP 100 via network I/F 207. MFP 100, in receipt of the redisplay request, transmits file names for identification of the data to projector 200, and projector 200 in turn displays a list of the file names on operation panel 205.

When the user inputs an instruction to select one of the file names included in the displayed list to operation panel 205, control portion 201 transmits the selected file name to MFP 100 via network I/F 207. In receipt of the file name, MFP 100 transmits history identification information for identification of history information corresponding to the data specified by the received file name to projector 200. In response, projector 200 displays the received history identification information on operation panel 205. When the user designates the history identification information displayed on operation panel 205, control portion 201 transmits the history identification information to MFP 100 via network I/F 207.

Figure 6:
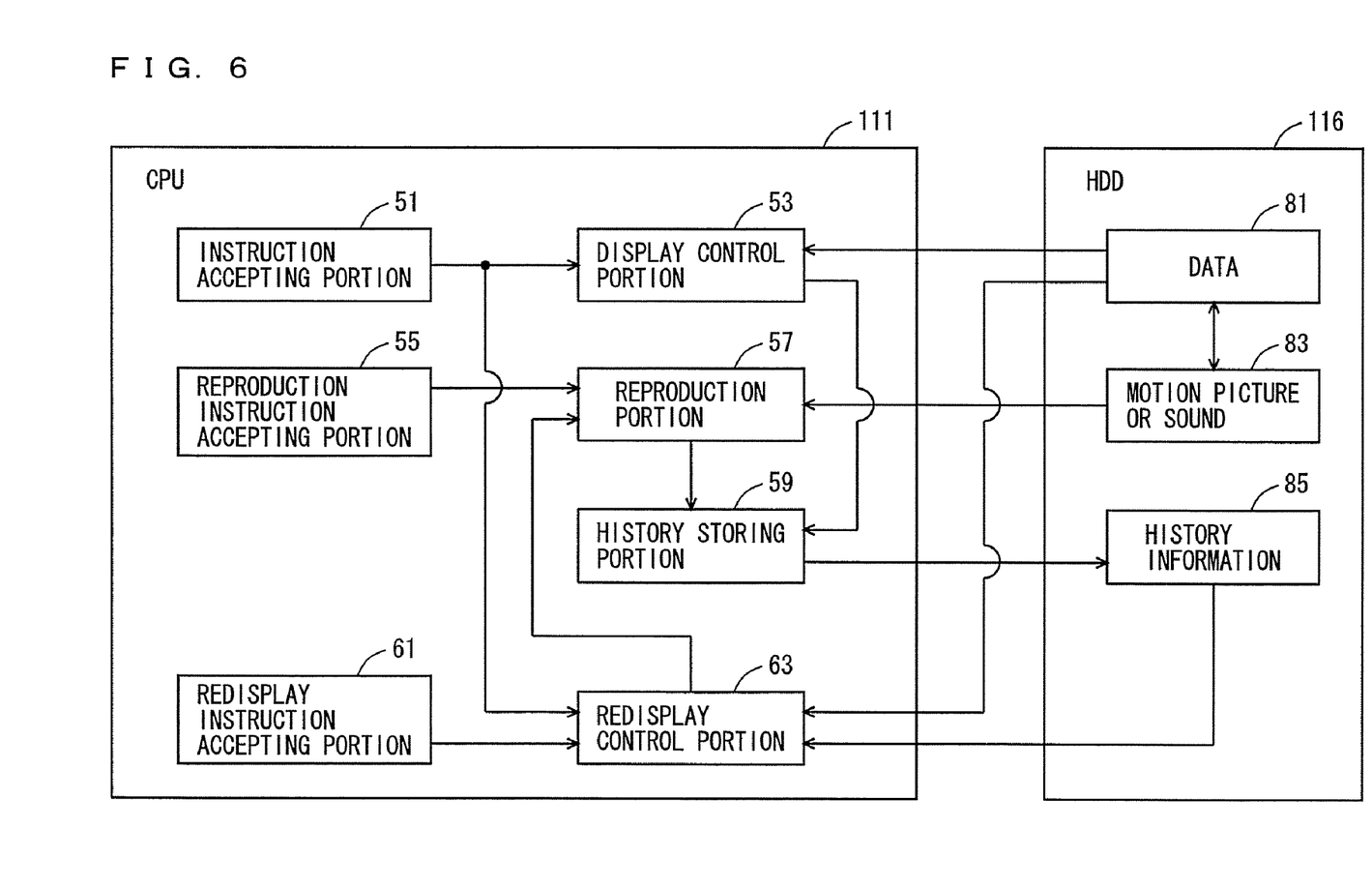
FIG. 6 is a functional block diagram showing by way of example the functions of a CPTJ included in the MFP, together with data stored in an HDD.

FIG. 6 is a functional block diagram showing an example of the functions of the CPU included in the MFP, together with data stored in the HDD. Referring to FIG. 6, CPU 111 includes: an instruction accepting portion 51 which accepts a "forward" instruction or a "back" instruction transmitted from projector 200; a display control portion 53 which causes an image of the page data specified by the "forward" or "back" instruction to be displayed on projector 200; a reproduction instruction accepting portion 55 which accepts a reproduction instruction; a reproduction portion 57 which causes the motion picture or the sound specified by the reproduction instruction to be reproduced by projector 200; a history storing portion 59 which stores a history of display or reproduction performed by projector 200; a redisplay instruction accepting portion 61 which accepts a redisplay instruction; and a redisplay control portion 63 which causes an image of the page data specified by the redisplay instruction to be displayed on projector 200.

HDD 116 stores data 81. Data 81 is the data of an original having an image formed therein, which is read and output by image reading portion 20 when the user inputs to operation portion 115 an instruction to direct image reading portion 20 to read the original. Alternatively, data 81 may be the data which is received from a PC connected to network 2 by data communication control portion 117. Still alternatively, data 81 may be the data which is received as print data from a PC connected to network 2 by data communication control portion 117.

When data communication control portion 117 receives a data transmission request from projector 200, instruction accepting portion 51 transmits file names of the data stored in HDD 116 to projector 200 via data communication control portion 117. When data communication control portion 117 receives a definition data transmission request from projector 200, instruction accepting portion 51 reads from HDD 116 data 81 which is specified by the file name included in the definition data transmission request, and transmits the definition data included in the read data 81 to projector 200 via data communication control portion 117. Further, when data communication control portion 117 receives a "forward" or "back" instruction from projector 200, instruction accepting portion 51 outputs the "forward" or "back" instruction to display control portion 53.

While it is assumed here that instruction accepting portion 51 accepts the "forward" or "back" instruction from projector 200, it may be configured such that instruction accepting portion 51 accepts the "forward" or "back" instruction which the user inputs via operation portion 115. In the case where the user operates PC 300 connected to network 2 for remote control of MFP 100, it may be configured such that instruction accepting portion 51 accepts the "forward" or "back" instruction which data communication control portion 117 receives from PC 300.

In receipt of the "forward" or "back" instruction from instruction accepting portion 51, display control portion 53 causes the page data which is specified by the input "forward" or "back" instruction to be displayed on projector 200. Specifically, display control portion 53 specifies the page number from the "forward" or "back" instruction input from instruction accepting portion 51, and transmits the page data of the specified page number from among a plurality of page data included in data 81, to projector 200 via data communication control portion 117. More specifically, in the case where a "forward" instruction is input, display control portion 53 specifies the page number immediately following that of the page data being displayed at that time, whereas in the case where a "back" instruction is input, display control portion 53 specifies the page number immediately preceding that of the page data being displayed at that time. Further, display control portion 53 outputs to history storing portion 59 the page number of the page data which has been transmitted to projector 200.

As described above, control portion 201 included in projector 200 is configured such that, in the case where the page data to be projected by projecting portion 203 is linked with a motion picture or a sound, control portion 201 transmits a reproduction request to MFP 100 in response to a user's input of a reproduction instruction to operation panel 205. When data communication control portion 117 receives the reproduction request from projector 200, reproduction instruction accepting portion 55 outputs the reproduction instruction to reproduction portion 57.

Reproduction portion 57 reads from HDD 116 the motion picture or sound 83 which is specified by the identification information included in the reproduction instruction, and transmits the same to projector 200. As used herein, the "motion picture" is a concept which includes both the moving image and the sound. Further, reproduction portion 57 accepts the state of reproduction of the motion picture or the sound which data communication control portion 117 receives from projector 200 after transmission of motion picture or sound 83 to projector 200, and outputs the identification information and the state of reproduction to history storing portion 59.

In receipt of the page number from display control portion 53, history storing portion 59 generates a history record including the page number, and adds the generated history record to the history information stored in HDD 116. History storing portion 59 generates a history record every time a page number is input from display control portion 53.

Figure 7:
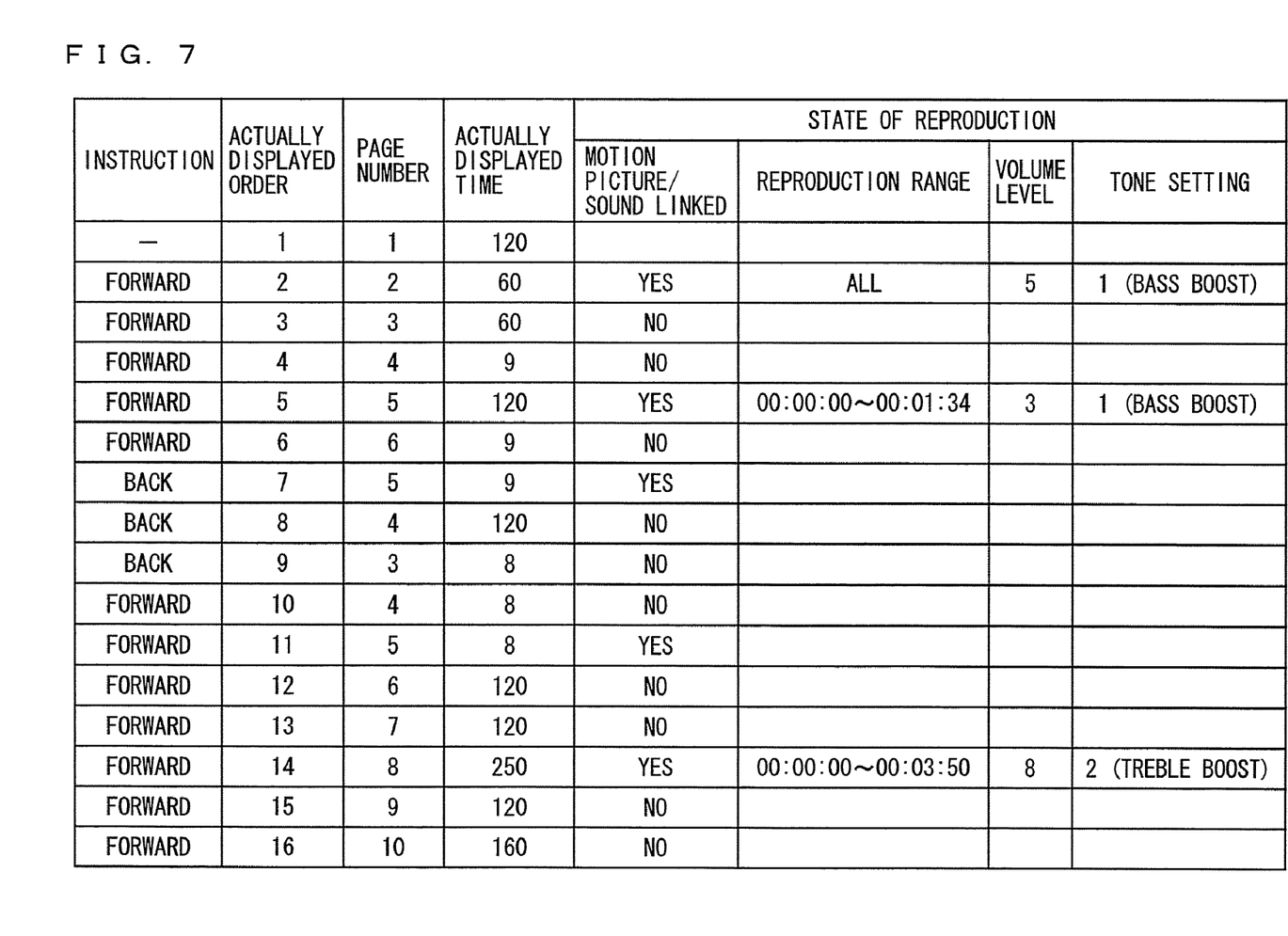
FIG. 7 shows an example of history information.

FIG. 7 shows an example of the history information. Referring to FIG. 7, with one history record being added every time a page of page data is displayed, the history information includes a number of history records corresponding to the number of the page data that have been displayed. The history record includes the fields of: instruction; actually displayed order; page number; actually displayed time; and state of reproduction. In the history record, the page number for identification of the page data, the actually displayed time indicating the time period during which the page data was displayed, and the actually displayed order indicating the order in which the page data was displayed are associated with each other. The "instruction" field includes the content of the instruction input by the user to projector 200, in which either one of "forward" and "back" corresponding to the "forward" instruction and the "back" instruction, respectively, is set. In the "actually displayed order" field, the order in which the page data was displayed is set. In the "page number" field, the page number of the page data displayed is set. In the "actually displayed time" field, the time period during which the page data was displayed on projector 200 is set. The time period may be the time period from the time when a "forward" or "back" instruction was input to the time when a next "forward" or "back" instruction is input. Alternatively, projector 200 may be configured to measure the time period during which projector 200 has actually displayed the page data, in which case the actually displayed time may be received from projector 200.

In the "state of reproduction" field, the state of reproduction of motion picture or sound is set. The "state of reproduction" field includes the fields of: motion picture/sound linked; reproduction range; volume; and tone. In the "motion picture/sound linked" field, either "Yes" or "No" is set to indicate whether the page data is linked with a motion picture or a sound. In the "reproduction range" field, the reproduced range of the motion picture or the sound is set. Here, the reproduction range of the motion picture or the sound is indicated by the time from the start of the motion picture or the sound to the end of reproduction thereof. In the "volume" field or the "tone" field, the volume or the tone set in projector 200 upon reproduction of the sound is set. In this example, the tone includes: setting "1" for setting the tone to emphasize or boost the bass, and setting "2" for setting the tone to boost the treble.

Returning to FIG. 6, when history information 85 is designated, redisplay instruction accepting portion 61 outputs a redisplay instruction to redisplay control portion 63. The redisplay instruction includes a file name of data 81 and history identification information of history information 85. Specifically, when data communication control portion 117 receives a redisplay request from projector 200, redisplay instruction accepting portion 61 transmits the file names of data 81 stored in HDD 116 to projector 200 via data communication control portion 117. When data communication control portion 117 receives the file name from projector 200, redisplay instruction accepting portion 61 transmits history identification information for identification of history information 85 that corresponds to the data specified by the received file name and is stored in HDD 116, to projector 200 via data communication control portion 117. If HDD 116 stores therein a plurality of pieces of history information 85 corresponding to the data specified by the file name received from projector 200, redisplay instruction accepting portion 61 transmits a plurality of pieces of history identification information corresponding respectively to the plurality of history information 85 to projector 200. Further, when data communication control portion 117 receives the history identification information from projector 200, redisplay instruction accepting portion 61 determines that history information 85 specified by the history identification information has been designated. Furthermore, when data communication control portion 117 receives a "forward" instruction or a "back" instruction from projector 200, redisplay instruction accepting portion 61 outputs the received "forward" or "back" instruction to redisplay control portion 63.

While it is assumed here that redisplay instruction accepting portion 61 accepts the file name, the history identification information, and the "forward" or "back" instruction from projector 200, it may be configured to accept the file name, the history identification information, and the "forward" or "back" instruction that the user inputs by operating operation portion 115, or in the case where the user operates PC 300 connected to network 2 for remote control of MFP 100, it may be configured to accept the "forward" or "back" instruction that data communication control portion 117 receives from PC 300.

In receipt of the redisplay instruction, redisplay control portion 63 reads from HDD 116 history information 85 which is specified by the history identification information included in the redisplay instruction. Redisplay control portion 63 then causes the plurality of page data which are included in data 81 specified by the file name included in the redisplay instruction to be displayed on projector 200 in accordance with the actually displayed order that is set in the "actually displayed order" field in history information 85. It is noted that the page data which are displayed on projector 200 by redisplay control portion 63 are only those having the actually displayed time of not less than a predetermined time period set in the corresponding field in history information 85, which are displayed in the same order as the actually displayed order that is set in the corresponding field in history information 85. Specifically, redisplay control portion 63 firstly selects, from a plurality of history records included in history information 85, the first history record having the smallest value set in its "actually displayed order" field, to firstly select the page data that is specified by the page number set in the corresponding field of the selected history record. Thereafter, redisplay control portion 63 selects the page data in accordance with the "forward" or "back" instruction input from redisplay instruction accepting portion 61. When the "forward" instruction is input, it selects the history record having the actually displayed order immediately following (succeeding) that of the history record being selected at that time, while when the "back" instruction is input from redisplay instruction accepting portion 61, it selects the history record having the actually displayed order immediately preceding that of the history record being selected at that time. In the case where the actually displayed time set in the selected history record is not less than the predetermined time period, redisplay control portion 63 transmits the page data specified by the page number set in the selected history record to projector 200. On the other hand, if the actually displayed time set in the selected history record is less than the predetermined time period, redisplay control portion 63, rather than transmitting the page data specified by the page number set in that history record to projector 200, selects the history record having the actually displayed order further preceding or succeeding that of the history record being selected, and determines whether the actually displayed time set in that selected history record is not less than the predetermined time period.

In other words, in the case where the "forward" instruction is input, the page data which has been actually displayed for the predetermined time period or more and which is specified by the page number associated with the actually displayed order succeeding that of the page data being selected at that time is transmitted to projector 200, while in the case where the "back" instruction is input, the page data which has been actually displayed for the predetermined time period or more and which is specified by the page number associated with the actually displayed order preceding that of the page data being selected at that time is transmitted to projector 200.

Since only the page data for which the actually displayed time set in history information 85 is not less than a predetermined time period are transmitted to and projected by projector 200, the page data that the presenter did not display on projector 200 or the page data that the presenter displayed on projector 200 but did not explain in the past presentation are not displayed on projector 200. This prevents the page data the presenter did not use in the past from being displayed on projector 200. Further, the plurality of page data included in data 81 can be displayed on projector 200 in the same order as they were displayed on projector 200 in the past.

In the case where the page data transmitted to projector 200 is linked with motion picture or sound 83, redisplay control portion 63 outputs a reproduction instruction to reproduction portion 57. Specifically, when transmitting the page data to projector 200, if the history record being selected at that time has "Yes" set in the "motion picture/sound linked" field in the "state of reproduction" field and has a reproduction time set in the "reproduction range" field, redisplay control portion 63 outputs to reproduction portion 57 the reproduction instruction including the history record being selected.

In receipt of the reproduction instruction, reproduction portion 57 reads from HDD 116 motion picture or sound 83 that is associated with the page data specified by the page number in the history record included in the reproduction instruction, and transmits the read motion picture or sound 83 and the state of reproduction set in the corresponding field in the history record to projector 200. Projector 200, in receipt of motion picture or sound 83 and the state of reproduction, reproduces motion picture or sound 83 in accordance with the state of reproduction. This allows motion picture or sound 83, which was reproduced by the presenter in the past, to be reproduced in the same state of reproduction as it was reproduced in the past. Motion picture or sound 83 which was not reproduced in the past is not transmitted to or reproduced by projector 200. This eliminates the need for the user to input an instruction to reproduce motion picture or sound 83 in the case where the redisplay instruction is input, and also eliminates the need for the user to set the state of reproduction in the case where motion picture or sound 83 is reproduced.

For example, assume that the history information shown in FIG. 7 is selected. In this case, the page data having the page numbers of "1", "2", "3", "5", "4", "6", "7", "8", "9", and "10" are displayed in this order. That is, as the display order of the page data of the fifth page and the fourth page was switched in the past, they are displayed in the actually displayed order after switching. Further, while the page data having the page numbers of "2", "5", and "8" are associated with the motion picture or the sound, the motion picture or the sound is reproduced when the page data having the page numbers of "2", "5", and "8" and corresponding to the actually displayed order of "2", "5", and "14", respectively, are displayed.

Figure 8:
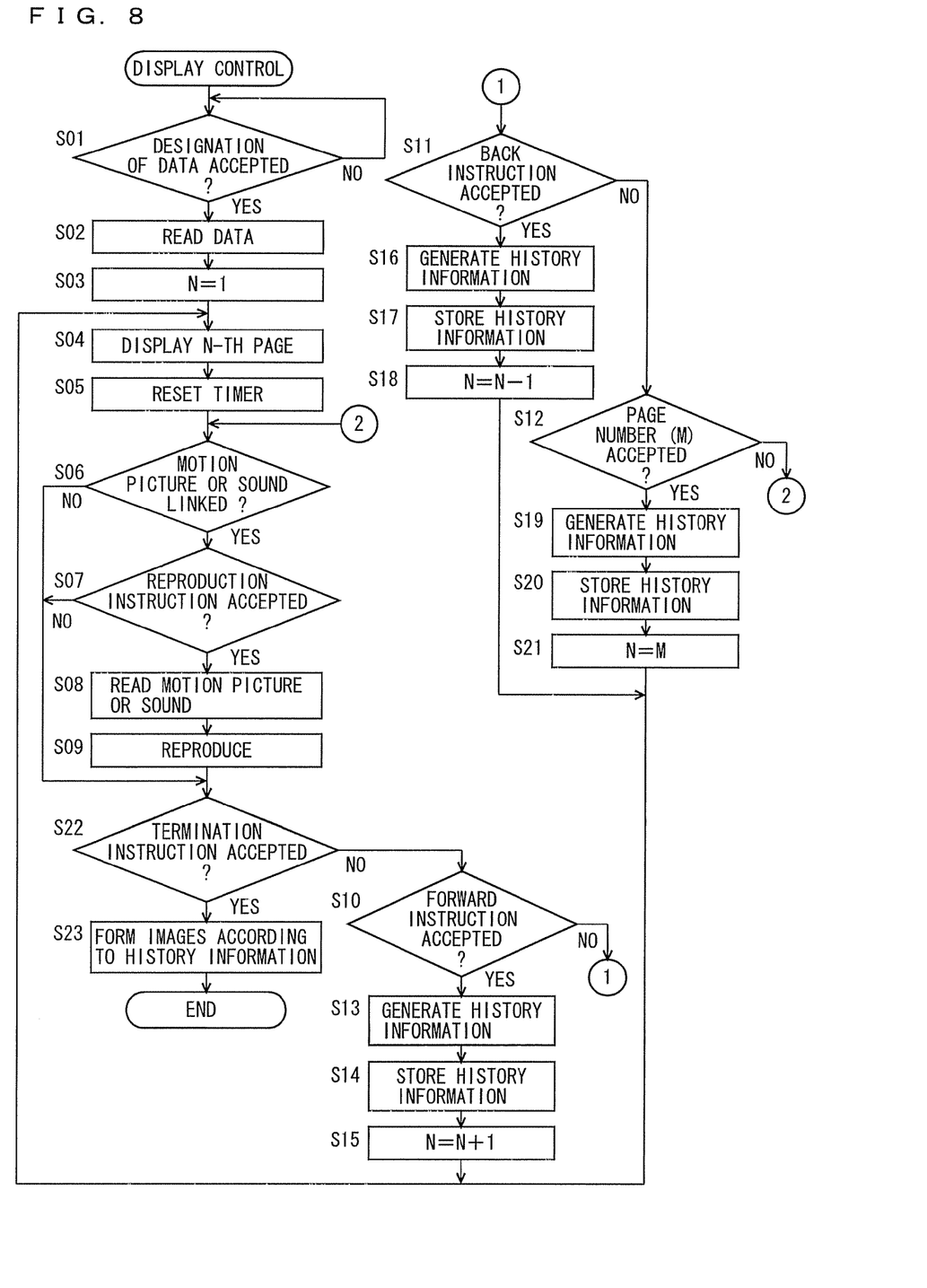
FIG. 8 is a flowchart illustrating an example of the flow of display control processing.

FIG. 8 is a flowchart illustrating an example of the flow of display control processing, which is carried out by CPU 111 included in MFP 100 as CPU 111 performs a display control program. Referring to FIG. 8, CPU 111 determines whether designation of data has been accepted (step S01). When data communication control portion 117 receives the file name of data 81 stored in HDD 116 from projector 200, the designation of data 81 of that file name is accepted. More specifically, in response to a request from projector 200, the file names of data 81 stored in HDD 116 are transmitted to projector 200 via data communication control portion 117. Data communication control portion 117 then receives from projector 200 a definition data transmission request, which includes a file name. With reception of this definition data transmission request, the designation of data 81 specified by the file name included in that request is accepted.

In step S02, data 81 designated in step S01 is read from HDD 116. In this case, the read data 81 is temporarily stored in RAM 112. Further, CPU 111 transmits the definition data included in the read data 81 to projector 200 via data communication control portion 117.

In the following step S03, a variable N is set to "1" (step S03). Variable N indicates the page number of the page data which is to be processed among the plurality of page data included in data 81. In step S04, the page data of the N-th page is displayed. Specifically, the page data with the page number of "N" included in data 81 is transmitted to projector 200 to cause it to display the page data of the N-th page. A timer is then reset (step S05). The timer counts the time period during which the page data is displayed by projector 200.

In the following step S06, it is determined whether the page data of the N-th page is linked with a motion picture or a sound. In determination, the definition data included in data 81 is referred to. If the page data of the N-th page is linked with a motion picture or a sound, the process proceeds to step S07; otherwise, the process proceeds to step S22.

In step S07, it is determined whether a reproduction instruction has been accepted. The reproduction instruction includes the identification information for identification of the motion picture or the sound, and the state of reproduction. The state of reproduction includes the reproduction range, volume, and tone. When data communication control portion 117 receives the reproduction instruction from projector 200, the reproduction instruction is accepted; otherwise, the reproduction instruction is not accepted. If the reproduction instruction is accepted, the process proceeds to step S08; otherwise, the process proceeds to step S22. In step S08, the motion picture or the sound specified by the identification information included in the reproduction instruction is read from HDD 116. The read motion picture or sound 83 is then reproduced (step S09). Specifically, the read motion picture or sound 83 is transmitted to projector 200 via data communication control portion 117, to cause projector 200 to reproduce the motion picture or the sound.

In step S22, it is determined whether a termination instruction has been accepted. If so, the process proceeds to step S23; otherwise, the process proceeds to step S10.

In step S10, it is determined whether a "forward" instruction has been accepted. The "forward" instruction is accepted when data communication control portion 117 receives it from projector 200. If the "forward" instruction is accepted, the process proceeds to step S13; otherwise, the process proceeds to step S11. In step S11, it is determined whether a "back" instruction has been accepted. The "back" instruction is accepted when data communication control portion 117 receives it from projector 200. If the "back" instruction is accepted, the process proceeds to step S16; otherwise, the process proceeds to step S12.

In step S12, it is determined whether a page number (M) has been accepted. The page number (M) is accepted when data communication control portion 117 receives it from projector 200. If the page number (M) is accepted, the process proceeds to step S19; otherwise, the process returns to step S06.

In step S13, history information is generated. Specifically, a history record is generated in which the actually displayed order, the page number (N) of the page data which has been displayed in step S04 among the plurality of page data included in the data, the actually displayed time, and the state of reproduction of motion picture or sound 83 which has been reproduced in step S09 are associated with each other. The actually displayed order corresponds to the number of times step S04 has been performed. The actually displayed time corresponds to the time period from the time when the page data was displayed in step S04 to the time when the "forward" instruction is accepted in step S10.

Then, the history information is stored in HDD 116 (step S14), and the process proceeds to step S15. Specifically, the history record generated in step S13 is added to history information 85 that is stored in HDD 116. In step S15, variable N is set to the value incremented by 1, and the process returns to step S04. With the "forward" instruction accepted, the following page data is displayed in step S04.

In step S16, the history information is generated as in step S13, and in step S17, the history record generated in step S16 is added to history information 85 that is stored in HDD 116, as in step S14. The process then proceeds to step S18. The actually displayed order corresponds to the number of times step S04 has been performed. The actually displayed time corresponds to the time period from the time when the page data was displayed in step S04 to the time when the "back" instruction is accepted in step S11. In step S18, variable N is set to the value decremented by 1, and the process returns to step S04. With the "back" instruction accepted, the preceding page data is displayed in step S04.

In step S19, the history information is generated as in step S13, and in step S20, the history record generated in step S19 is added to history information 85 that is stored in HDD 116, as in step S14. The process then proceeds to step S21. The actually displayed order corresponds to the number of times step S04 has been performed. The actually displayed time corresponds to the time period from the time when the page data was displayed in step S04 to the time when the page number (M) is accepted in step S12. In step S21, variable N is set to the value identical to the page number (M), and the process returns to step S04. With the page number (M) accepted, the page data of that page number (M) is displayed in step S04.

In step S23, images of the data designated in step S01 are formed on sheets of pager in accordance with the history information. Specifically, the images of the plurality of page data included in the designated data 81 are output to image forming portion 30 in ascending order of the actually displayed order included in the history information stored in HDD 116, to cause image forming portion 30 to form the images. The page data having the actually displayed time less than a predetermined time (here, ten seconds) are not output to image forming portion 30. This allows the images of the plurality of page data that have been used for presentation by the presenter to be formed on the sheets of paper, in the order in which they were actually used during the presentation.

Figure 9:
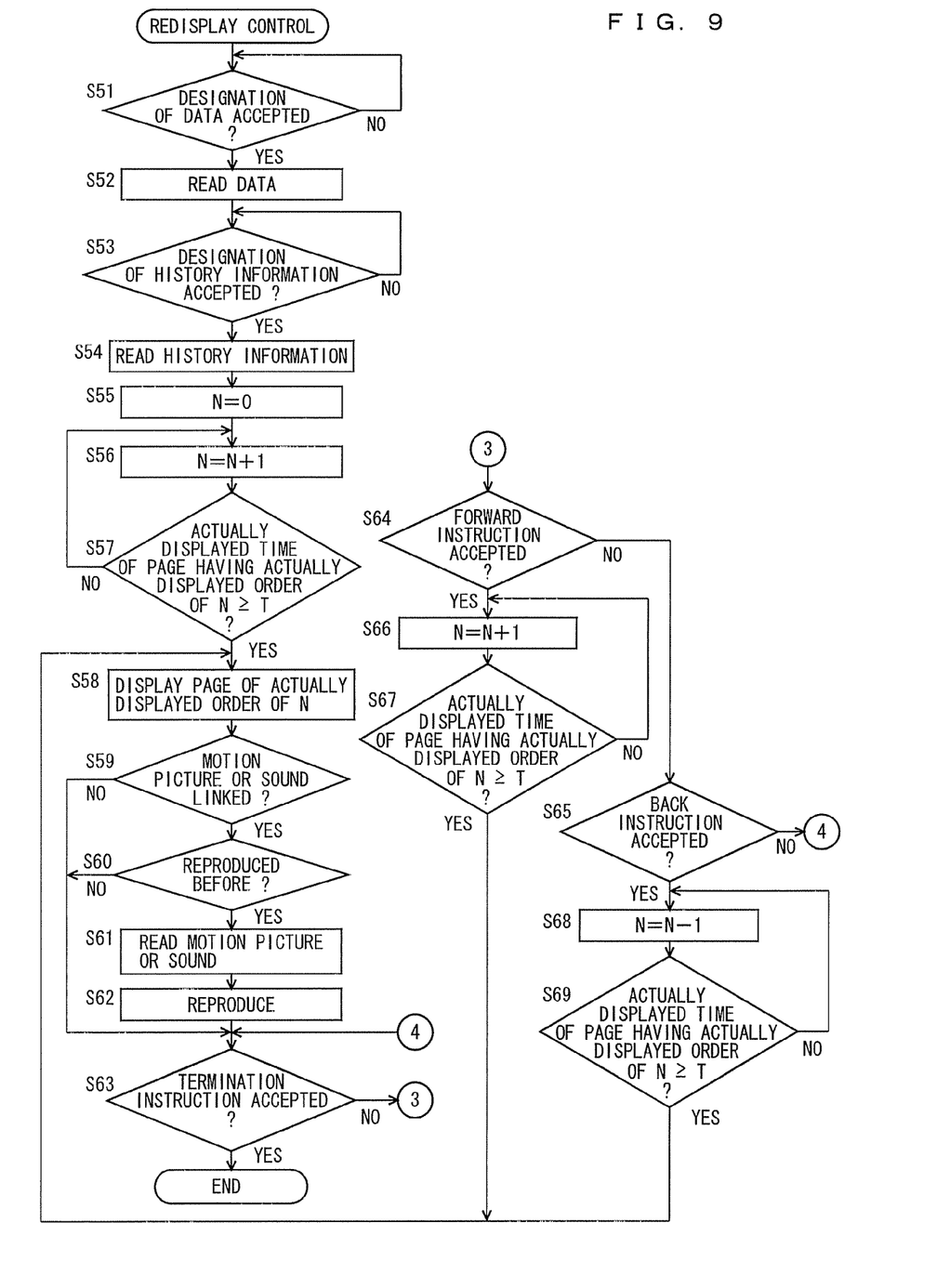
FIG. 9 is a flowchart illustrating an example of the flow of redisplay control processing.

FIG. 9 is a flowchart illustrating an example of the flow of redisplay control processing, which is carried out by CPU 111 included in MFP 100 as CPU 111 performs the display control program. Referring to FIG. 9, CPU 111 determines whether designation of data 81 stored in HDD 116 has been accepted (step S51). In response to a request from projector 200, file names of data 81 stored in HDD 116 are transmitted to projector 200 via data communication control portion 117, and when data communication control portion 117 receives the file name from projector 200, the designation of the data is accepted. CPU 111 is in a standby mode until designation of data is accepted, and once the designation of data is accepted, the process proceeds to step S52. In step S52, data 81 having the received file name is read from HDD 116, and the process proceeds to step S53. When the file name of data 81 stored in HDD 116 is received, the designation of data 81 having that file name is accepted.

Next, it is determined whether designation of history information has been accepted (step S53). Specifically, in response to a request from projector 200, history identification information for identification of history information 85 which is stored in HDD 116 and associated with data 81 having the file name accepted in step S51 is transmitted to projector 200 via data communication control portion 117, and when data communication control portion 117 receives the history identification information from projector 200, the designation of history information 85 is accepted. CPU 111 is in a standby mode until designation of history information 85 is accepted, and once the designation of history information 85 is accepted, the process proceeds to step S54. In step S54, history information 85 designated in step S53 is read from HDD 116, and the process proceeds to step S55.

In step S55, the variable N is set to "0". Variable N is the page number applied to the page data which is to be processed among the plurality of page data included in data 81. In the following step S56, variable N is set to "1", and the process proceeds to step S57. This is to cause the page data having the actually displayed order of "1" to firstly be displayed on projector 200.

Next, it is determined whether the actually displayed time set in the corresponding field of the history record which has "N" set in the "actually displayed order" field, among the plurality of history records included in history information 85 read in step S54, is not less than a threshold value T (step S57). Threshold value T may be determined arbitrarily as the time necessary for switching the display to next page data. For example, threshold value T is set to the time that is required for the presenter to see the image of the page data displayed on the projector and determine that it is unnecessary to display the same and input an instruction to switch the display to the image of the next page data and that image is displayed on the projector. Here, the threshold value is set to ten seconds. If the actually displayed time is not less than threshold value T, the process proceeds to step S58; otherwise, the process returns to step S56. This is to prevent the page data that was displayed only for a time period less than the threshold value of ten seconds when data 81 was displayed in the past from being displayed.

In step S58, the page with the actually displayed order of "N" is displayed. Specifically, the page data with the actually displayed order of "N" is transmitted to projector 200 via data communication control portion 117, to cause the corresponding image to be projected by projector 200. It is then determined whether the displayed page data is associated with a motion picture or a sound (step S59). Specifically, it is determined that the page data is associated with a motion picture or a sound if "Yes" is set in the "motion picture/sound linked" field in the "state of reproduction" field in history information 85, while it is determined that the page data is not associated with a motion picture or a sound if "No" is set therein. If the page data is associated with a motion picture or a sound, the process proceeds to step S60; otherwise, the process proceeds to step S63.

In step S60, it is determined whether reproduction has been made before. Specifically, it is determined whether a value has been set in the "reproduction range" field in the history record having "N" set in the "actually displayed order" field among the history records included in history information 85 read in step S54. If a value is set in the "reproduction range" field, it is determined that reproduction has been made before, and the process proceeds to step S61; otherwise, the process proceeds to step S63. This is to prevent the motion picture or the sound that has not been reproduced before from being reproduced, so that the data is redisplayed with the motion picture or the sound reproduced in the same timing as in the past.

In step S61, motion picture or sound 83 that is associated with the page data having the actually displayed order of "N" is read from HDD 116. The read motion picture or sound 83 is reproduced (step S62), and the process proceeds to step S63. Specifically, the read motion picture or sound 83 and the value set in the "state of reproduction" field in the history record included in history information 85 read in step S54 are transmitted to projector 200 via data communication control portion 117, so that the data is reproduced by projector 200 in accordance with that state of reproduction.

In step S63, it is determined whether a termination instruction has been accepted. If so, the process is terminated; otherwise, the process proceeds to step S64. In step S64, it is determined whether a "forward" instruction has been accepted. The "forward" instruction is accepted when data communication control portion 117 receives the "forward" instruction from projector 200. If the "forward" instruction is accepted, the process proceeds to step S66; otherwise, the process proceeds to step S65. In step S65, it is determined whether a "back" instruction has been accepted. The "back" instruction is accepted when data communication control portion 117 receives the "back" instruction from projector 200. If the "back" instruction is accepted, the process proceeds to step S68; otherwise, the process returns to step S63.

In step S66, variable N is set to the value incremented by 1, and the process proceeds to step S67. In step S67, it is determined whether the actually displayed time set in the corresponding field in the history record having "N" set in the "actually displayed order" field, among the plurality of history records included in history information 85 read in step S54, is not less than the threshold value T. The page data corresponding to the history record having "N" set in the "actually displayed order" field is the page data having the actually displayed order immediately succeeding that of the page data which was displayed in step S58 performed previously. If the actually displayed time is not less than threshold value T, the process returns to step S58; otherwise, the process proceeds to step S66. This is to prevent the page data that was displayed only for a time period less than the threshold value (ten seconds) when data 81 was displayed in the past from being displayed.

In step S68, variable N is set to the value decremented by 1, and the process proceeds to step S69. In step S69, it is determined whether the actually displayed time set in the corresponding field in the history record having "N" set in the "actually displayed order" field, among the plurality of history records included in history information 85 read in step S54, is not less than the threshold value T. The page data corresponding to the history record having "N" set in the "actually displayed order" field is the page data having the actually displayed order immediately preceding that of the page data which was displayed in the previously performed step S58. If the actually displayed time is not less than threshold value T, the process returns to step S58; otherwise, the process returns to step S68. This is to prevent the page data that was displayed only for a time period less than the threshold value (ten seconds) when data 81 was displayed in the past from being displayed.

As described above, according to conference system 1 of the present embodiment, MFP 100 is connectable with projector 200, and when MFP 100 causes page data corresponding to an accepted page number among a plurality of page data included in data to be displayed on projector 200, a history record including the page number for identification of the displayed page data, the actually displayed time indicating the time period during which the page data was displayed, and the actually displayed order indicating the order in which the page data was displayed, is added to history information 85, and when history information 85 is designated, the plurality of page data included in the data are displayed on projector 200 according to the actually displayed order specified in history information 85. This allows a plurality of page data to be displayed again in the same order as they were displayed on projector 200 before.

When a "forward" instruction is accepted, the page data having the page number associated with the actually displayed order succeeding that of the page data being displayed and having the actually displayed time of not less than a predetermined time (e.g., ten seconds) set in the corresponding field in history information 85 is displayed on projector 200, while when a "back" instruction is accepted, the page data having the page number associated with the actually displayed order preceding that of the page data being displayed and having the actually displayed time of not less than the predetermined time is displayed on projector 200. This ensures accurate reproduction of the content of presentation, as the page data that was displayed only for a time period less than the predetermined time is not displayed.

Further, in the case where the page data being displayed on projector 200 among the plurality of page data is associated with a motion picture or a sound and the state of reproduction in which the motion picture or the sound was reproduced before is stored, the motion picture or the sound is reproduced in accordance with the stored state of reproduction. This enables the moving image or the sound to be reproduced in the same state as it was reproduced before.

While conference system 1 has been described in the above embodiment, the present invention may of course be understood as a display control method for carrying out the processing shown in FIG. 8 or 9, or a display control program for causing CPU 111 included in MFP 100 to carry out the display control method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data processing apparatus operatively connectable with a display apparatus, comprising: a processor;
   a data storing portion to store data which includes a plurality of page data as a predetermined display unit, the plurality of page data having corresponding page numbers;
   an instruction accepting portion to accept a page number of one page data which is to be displayed on said display apparatus among the plurality of page data included in said stored data;
   a display control portion to cause the page data of said accepted page number among the plurality of page data included in said data to be displayed on said display apparatus;
   a history storing portion to store, for each of the page data which has been displayed, a display history including identification information for identification of the page data, an actually displayed time indicating the time during which the page data was displayed, and an actually displayed order indicating the order in which the page data was displayed; and
   a redisplay control portion to cause the plurality of page data included in said data to be displayed on said display apparatus based on said display history on the condition that said display history is designated;
   wherein said instruction accepting portion accepts a forward instruction and a back instruction, and
   in the case where said forward instruction is accepted, said redisplay control portion controls such that the page data which is specified by said identification information associated with the actually displayed order succeeding the actually displayed order of the page data being displayed and which has the actually displayed time of not less than a predetermined time period in said designated display history is displayed on said display apparatus, and, in the case where said back instruction is accepted, said redisplay control portion controls such that the page data which is specified by said identification information associated with the actually displayed order preceding the actually displayed order of the page data being displayed and which has the actually displayed time of not less than the predetermined time period is displayed on said display apparatus.

2. The data processing apparatus according to claim 1, wherein in the case where said forward instruction is accepted, said display control portion controls such that the page data among said plurality of page data which has the page number succeeding the page number of the page data being displayed is displayed on said display apparatus, and, in the case where said back instruction is accepted, said display control portion controls such that the page data among said plurality of page data which has the page number preceding the page number of the page data being displayed is displayed on said display apparatus.

3. The data processing apparatus according to claim 1, wherein said plurality of page data include specified page data associated with a motion picture or a sound,
the data processing apparatus further comprising:
a reproduction instruction accepting portion to accept a reproduction instruction in the case where the page data being displayed on said display apparatus among said plurality of page data corresponds to said specified page data; and
a reproduction portion to reproduce the motion picture or the sound associated with said specified page data being displayed on said display apparatus among said plurality of page data in the case where said reproduction instruction is accepted; wherein
in the case where the motion picture or the sound associated with said specified page data is reproduced, said history storing portion further stores the state of reproduction of the motion picture or the sound, and
in the case where the state of reproduction has been stored corresponding to said specified page data being displayed on said display apparatus by said redisplay control portion among said plurality of page data, said reproduction portion reproduces the motion picture or the sound associated with said specified page data in accordance with said stored state of reproduction.

4. A display control method carried out in a data processing apparatus operatively connectable with a display apparatus, the method comprising:
a first storing step of storing data which includes a plurality of page data as a predetermined display unit, the plurality of page data having corresponding page numbers;
an accepting step of accepting a page number of one page data which is to be displayed on said display apparatus among the plurality of page data included in said stored data;
a first display step of causing the page data of said accepted page number among the plurality of page data included in said data to be displayed on said display apparatus;
a second storing step of storing a display history including identification information for identification of the page data displayed, an actually displayed time indicating the time during which the page data was displayed, and an actually displayed order indicating the order in which the page data was displayed; and
a second display step of causing the plurality of page data included in said data to be displayed on said display apparatus based on said display history on the condition that said display history is designated;
wherein said accepting step includes the step of accepting a forward instruction and a back instruction, and
wherein said second display step includes the steps of:

in the case where said forward instruction is accepted, controlling such that the page data which is specified by said identification information associated with the actually displayed order succeeding the actually displayed order of the page data being displayed and which has the actually displayed time of not less than a predetermined time period in said designated display history is displayed on said display apparatus, and
in the case where said back instruction is accepted, controlling such that the page data which is specified by said identification information associated with the actually displayed order preceding the actually displayed order of the page data being displayed and which has the actually displayed time of not less than the predetermined time period is displayed on said display apparatus.

5. The display control method according to claim 4, wherein said first display step includes the steps of:
in the case where said forward instruction is accepted, controlling such that the page data among said plurality of page data which has the page number succeeding the page number of the page data being displayed is displayed on said display apparatus; and
in the case where said back instruction is accepted, controlling such that the page data among said plurality of page data which has the page number preceding the page number of the page data being displayed is displayed on said display apparatus.

6. The display control method according to claim 4, wherein said plurality of page data include specified page data associated with a motion picture or a sound,
the method further comprising the steps of:
accepting a reproduction instruction in the case where the page data being displayed on said display apparatus among said plurality of page data corresponds to said specified page data; and
reproducing the motion picture or the sound associated with said specified page data being displayed on said display apparatus among said plurality of page data in the case where said reproduction instruction is accepted; wherein
said second storing step includes the step of, in the case where the motion picture or the sound associated with said specified page data is reproduced, further storing the state of reproduction of the motion picture or the sound, and
said step of reproducing the motion picture or the sound includes the step of, in the case where the state of reproduction has been stored corresponding to said specified page data being displayed on said display apparatus in said second display step among said plurality of page data, reproducing the motion picture or the sound associated with said specified page data in accordance with said stored state of reproduction.

7. A non-transitory computer readable medium storing a display control program for causing a computer which controls a data processing apparatus operatively connectable with a display apparatus to execute the steps comprising:
a first storing step of storing data which includes a plurality of page data as a predetermined display unit, the plurality of page data having corresponding page numbers;
an accepting step of accepting a page number of one page data which is to be displayed on said display apparatus among the plurality of page data included in said stored data;

a first display step of causing the page data of said accepted page number among the plurality of page data included in said data to be displayed on said display apparatus;

a second storing step of storing a display history including identification information for identification of the page data displayed, an actually displayed time indicating the time during which the page data was displayed, and an actually displayed order indicating the order in which the page data was displayed; and a second display step of causing the plurality of page data included in said data to be displayed on said display apparatus based on said display history on the condition that said display history is designated;

wherein said accepting step includes the step of accepting a forward instruction and a back instruction, and wherein said second display step includes the steps of:

in the case where said forward instruction is accepted, controlling such that the page data which is specified by said identification information associated with the actually displayed order succeeding the actually displayed order of the page data being displayed and which has the actually displayed time of not less than a predetermined time period in said designated display history is displayed on said display apparatus, and in the case where said back instruction is accepted, controlling such that the page data which is specified by said identification information associated with the actually displayed order preceding the actually displayed order of the page data being displayed and which has the actually displayed time of not less than the predetermined time period is displayed on said display apparatus.

8. The non-transitory computer readable medium according to claim 7, wherein said first display step includes the steps of:

in the case where said forward instruction is accepted, controlling such that the page data among said plurality of page data which has the page number succeeding the page number of the page data being displayed is displayed on said display apparatus; and in the case where said back instruction is accepted, controlling such that the page data among said plurality of page data which has the page number preceding the page number of the page data being displayed is displayed on said display apparatus.

9. The non-transitory computer readable medium according to claim 7, wherein said plurality of page data include specified page data associated with a motion picture or a sound, the program causing said computer to further perform the steps of:

accepting a reproduction instruction in the case where the page data being displayed on said display apparatus among said plurality of page data corresponds to said specified page data; and reproducing the motion picture or the sound associated with said specified page data being displayed on said display apparatus among said plurality of page data in the case where said reproduction instruction is accepted; wherein said second storing step includes the step of, in the case where the motion picture or the sound associated with said specified page data is reproduced, further storing the state of reproduction of the motion picture or the sound, and said step of reproducing the motion picture or the sound includes the step of, in the case where the state of reproduction has been stored corresponding to said specified page data being displayed on said display apparatus in said second display step among said plurality of page data, reproducing the motion picture or the sound associated with said specified page data in accordance with said stored state of reproduction.

* * * * *